United States Patent
Chancellor et al.

(10) Patent No.: US 12,493,811 B2
(45) Date of Patent: Dec. 9, 2025

(54) VARIATIONAL ANALOG QUANTUM ORACLE LEARNING

(71) Applicant: Quantum Computing Inc., Leesburg, VA (US)

(72) Inventors: Nick Chancellor, Leesburg, VA (US); Raouf Dridi, Leesburg, VA (US)

(73) Assignee: Quantum Computing Inc., Leesburg, VA (US)

( * ) Notice: Subject to any disclaimer, the term of this patent is extended or adjusted under 35 U.S.C. 154(b) by 878 days.

(21) Appl. No.: 17/745,752

(22) Filed: May 16, 2022

(65) Prior Publication Data

US 2023/0368063 A1 Nov. 16, 2023

(51) Int. Cl.
*G06N 10/60* (2022.01)
*G06N 10/20* (2022.01)

(52) U.S. Cl.
CPC ............ *G06N 10/60* (2022.01); *G06N 10/20* (2022.01)

(58) Field of Classification Search
None
See application file for complete search history.

(56) References Cited

U.S. PATENT DOCUMENTS 11,449,760 B2 * 9/2022 Denchev ................ G06N 10/60
2020/0356889 A1 11/2020 Amin et al.

OTHER PUBLICATIONS

Benedetti et al., Quantum-Assisted Learning of Hardware-Embedded Probabilistic Graphical Models, Physical Review X 7, 041052 (2017); Total pp. 17 (Year: 2017).*
Dixit et al., Training and Classication using a Restricted Boltzmann Machine on the D-Wave 2000Q, arXiv:2005.03247v1 [cs.LG] May 7, 2020; Total pp. 14 (Year: 2020).*
Nicolas Chancellor, "Modernizing Quantum Annealing using Local Searches," New Journal of Physics, vol. 19, Feb. 10, 2017 (19 pages).
Mohammad H. Amin et al., "Quantum Boltzmann Machine," Physical Review X, vol. 8, Iss. 2, May 23, 2018, (11 pages).
Edward Farhi et al., "A Quantum Approximate Optimization Algorithm," Center for Theoretical Physics, Massachusetts Institute of Technology, arXiv:1411.4028v1 [quant-ph], Nov. 14, 2014 (16 pages).
Alberto Peruzzo et al., "A Variational Eigenvalue Solver on a Photonic Quantum Processor," Nature Communications 5, Article No. 4213, https://doi.org/10.1038/ncomms5213, Jul. 23, 2014 (7 pages).

* cited by examiner

*Primary Examiner* — Alan Chen
(74) *Attorney, Agent, or Firm* — Perkins Coie LLP

(57) ABSTRACT

A method includes configuring a quantum annealer based on a parameter of a Hamiltonian and performing annealing using the configured quantum annealer to obtain output samples, wherein each sample of the output samples indicates state values of elements of the quantum annealer for a set of indices of the output samples. The method also includes providing, to an oracle, the output samples to obtain a set of oracle outputs. The method also includes determining an expectation based on the set of oracle outputs and updating a parameter indexed by the set of indices based on the expectation and a learning rate parameter.

20 Claims, 5 Drawing Sheets

US 12,493,811 B2

VARIATIONAL ANALOG QUANTUM ORACLE LEARNING

BACKGROUND

Quantum annealing models find global minimum energy states by taking advantage of quantum tunneling phenomenon between energy states as modeled by qubits. A Hamiltonian may characterize the energy state of a quantum system. A quantum annealer may be used to form predictions based on inputs after configuring the parameters of the Hamiltonian. Once configured with the appropriate Hamiltonian parameters, a quantum annealer may determine outputs based on inputs. The outputs may represent a minimum energy state representing a predicted solution to a problem modeled by the Hamiltonian or a set of high-quality solution candidates.

SUMMARY

Computing systems may use quantum annealers to solve optimization problems modeled as a Hamiltonian system. A quantum annealing method may be implemented in quantum annealers, simulated using a gate-model quantum computer, or emulated in a classical computing device. The quantum annealing method may provide significant performance advantages over classical annealing methods by taking advantage of quantum tunneling effects or other quantum-scale phenomenon. However, conventional uses of quantum annealing involve applying minor embedding methods or equivalent methods (e.g., parity encoding methods) to map the optimization problem variables into chains of physical qubits. Furthermore, such a direct mapping may require the approximation of a cost function into a quadratic cost function, which may be inaccurate or impractical for modeling certain phenomena. In addition, some optimization applications may require that underlying models be kept secret from a machine learning model that uses quantum annealers. These secrecy requirements may severely reduce the viability of optimization methods that require the conversion of the variables of such underlying models into qubits and qubit interactions.

Some embodiments may address such issues and other issues by updating parameters of a Hamiltonian based on outputs of an oracle function, where the oracle function may be known or behave as a black box. Thus, a trained system may optimize the configuration parameters of a model for the oracle function even when the rules, algorithms, or models governing the oracle function are not necessarily known. After obtaining a Hamiltonian, some embodiments may configure a quantum annealer based on an initial set of configuration parameters for the Hamiltonian. The configuration parameters may include coupling parameters, field value parameters, offsets, or other parameters. Some embodiments may then perform a set of annealing operations to generate annealer output samples representing candidate solutions of an optimization problem. Some embodiments may then determine expectations for each pairwise combination of indices of the Hamiltonian based on the annealer output samples. For example, if $Z_1$ and $Z_2$ are the first two state values of the Hamiltonian, some embodiments may select a first subset of samples from the annealer output samples for the indices (1, 2) such that, for all samples in the first subset of samples, the product of $Z_1$ and $Z_2$ in the first subset is positive. In some embodiments, the selection may be probabilistic, such that the selection of the first and second subsets of samples may be selected with a greater likelihood in comparison to other subsets of samples. Similarly, some embodiments may select a second subset of samples from the annealer output samples for the indices (1, 2) such that, for all samples in the second subset of samples, the product of $Z_1$ and $Z_2$ in the second subset is negative.

Some embodiments may determine oracle outputs based on the samples provided by the quantum annealer and then update configuration parameters of a model based on the oracle outputs. For example, some embodiments may determine a first expectation for the first subset of samples by providing the first subset of samples to the oracle. Similarly, some embodiments may determine a second expectation for the second subset of samples by providing the second subset of samples to the oracle. Some embodiments may then update the coupling parameters of the Hamiltonian for each pairwise combination of indices based on a difference of the first and second expectations and a learning rate parameter. For example, some embodiments may update the interaction term $J_{1,2}$ to be equal to the previous $J_{1,2}$ after subtracting a product of a learning rate parameter and the difference of the first and second expectations.

Some embodiments may perform similar operations to update the field value parameters, offsets, or other parameters of a Hamiltonian model for a quantum annealer. For example, some embodiments may determine a first and second subset of samples associated with the index value k, where each state value $Z_k$ of the first subset of samples is positive, and where each state value $Z_k$ of the second subset of samples is negative. Some embodiments may then use the oracle function to determine a corresponding pair of expectations and then update the field value terms of the Hamiltonian based on the corresponding pair of expectations and the learning rate parameter. Some embodiments may then re-configure a quantum annealer based on the parameters of the Hamiltonian where re-configuring the quantum annealer may result in changing the strength of physical fields applied on qubits, changing the coupling strength of a junction that couples a set of qubits, etc.

Various other aspects, features, and advantages of the invention will be apparent through the detailed description of the invention and the drawings attached hereto. It is also to be understood that both the foregoing general description and the following detailed description are examples, and not restrictive of the scope of the invention.

DETAILED DESCRIPTION

Figure 1:
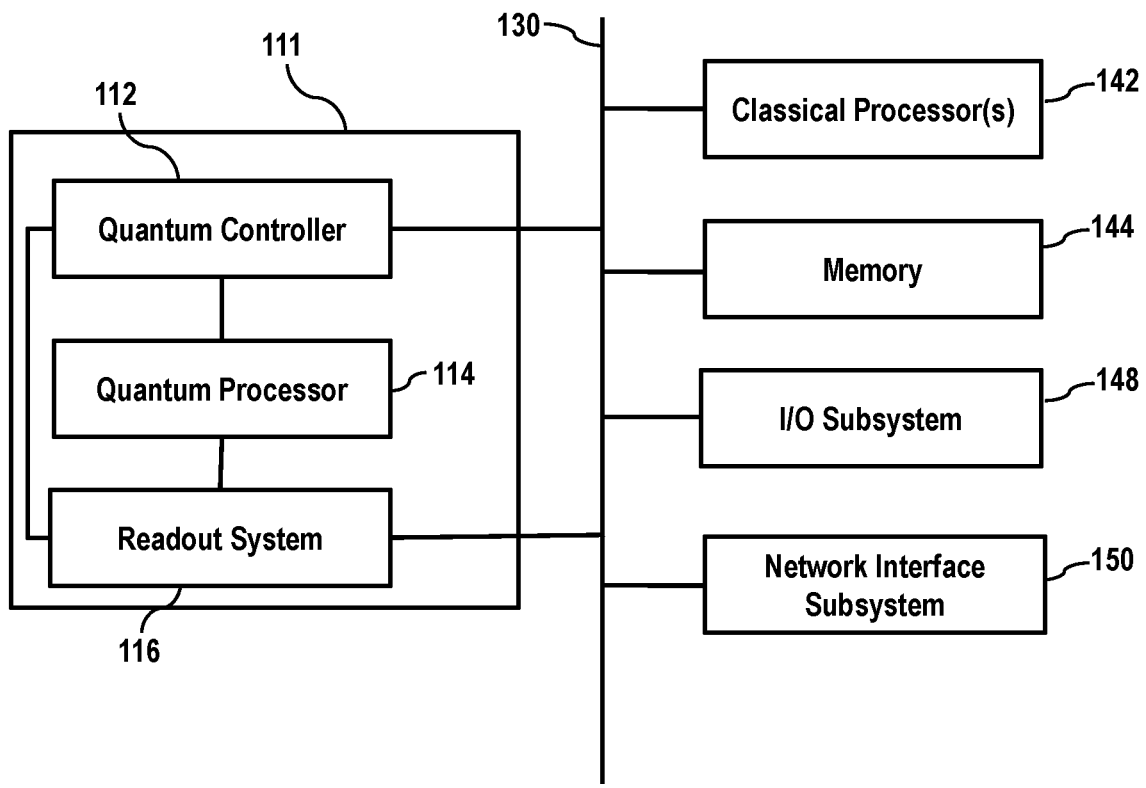
FIG. 1 shows an example computing system including a classical processor and a quantum processor, in accordance with one or more embodiments.

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Quantum annealing methods may be performed by quantum annealing devices or simulated by gate model algorithms of other quantum computing systems or classical computing systems. As used in this disclosure, a quantum annealer may include a quantum annealing device, another quantum computing system implementing an algorithm to simulate quantum annealing operations, or a classical computing system emulating quantum annealing operations. Some embodiments may use a quantum annealer by configuring the quantum annealer with a set of configuration parameters. The set of configuration parameters may be represented in various forms, such as being included in a configuration vector, being set as a list of properties of an object, being listed in a set of attribute-value pairs of a JSON format, etc. In many cases, a quantum annealer may benefit from the ability to learn both global and local identities as well as both single qubits and two-qubits interactions. The ability to train an optimization model based on the outputs of a quantum computing device may result in a significantly more robust problem-solving computing system based on the quantum computing device.

Some embodiments may perform operations described in this disclosure to control a quantum annealer to provide one or more of the features described above and or other features. Furthermore, some embodiments may perform reverse annealing operations of a quantum annealer to determine a more accurate set of state values or configuration parameters. Some embodiments may also use annealer offsets to advance the schedules of qubits to a state such that the qubits are unlikely to change from the initially provided state. Such operations may allow the identity of the variables of a state to be locally or globally learned. In addition, some embodiments may train a model by updating configuration parameters such as coupling parameters, field value parameters, or annealer offsets of a Hamiltonian used by a quantum annealer. By determining the Hamiltonian parameters, annealer offsets, or other Hamiltonian model parameters of the Hamiltonian, some embodiments may determine predictions for variables of an optimization problem encoded by the Hamiltonian.

Operations described in this disclosure may be applied to various types of quantum annealers, such as an analog quantum annealing device. An analog quantum annealing device may include various types of devices that include a set of qubits, where the set of qubits may include circuits of superconducting material. Some embodiments take advantage of qubit-related physical phenomena such as magnetic flux fluctuations and Josephson tunneling and measure changes in the state of the qubits. Some embodiments may alter the rate by which these physical phenomena occur or their probability by configuring model parameters. After annealing, the set of qubits may settle into a lower energy state that reflects a solution to an optimization problem. Alternatively, using a quantum annealer may include using an emulated quantum annealer of a gate model quantum computing device, a coherent Ising machine or another optical device, a path-integral quantum Monte Carlo model, or another type of classical emulation of a quantum system, etc. Furthermore, some embodiments described in this disclosure may apply to other types of models that may stochastically return results that preferentially minimize energy with respect to a programmable Hamiltonian. For example, some embodiments may perform training operations described in this disclosure to train classical Monte Carlo models.

FIG. 1 shows an example computing system 100 including a classical processor and a quantum processor, in accordance with one or more embodiments. The example computing system 100 includes a classical processor 142 may be used to perform classical processing operations described in this disclosure. For example, the classical processor 142 may perform operations to execute an oracle function or otherwise behave as an oracle. In some embodiments, the classical processor 142 may perform operations to communicate values to a quantum annealer 111 without performing operations to compute the values. The quantum annealer 111 may include a quantum controller 112, a quantum processor 114, and a readout system 116. For example, some embodiments may receive a set of values from an oracle via a network interface 150 and communicate the set of values to the quantum processor 114.

The classical processor 142 may be used in various types of computing devices, such as desktop computers, laptop computers, mobile computing devices, distributed computing devices, mainframe computing devices, etc. The classical processor 142 may be used to execute one or more operations described in this disclosure, such as retrieving or storing values in a memory 144, obtaining inputs or determining outputs to be communicated via the input/output (I/O) subsystem 148, or obtaining values or outputting values via the network interface 150. The classical processor 142 may include various types of logic processing units, such as a processing unit with one or more central processing units ("CPUs"), graphics processing units ("GPUs"), digital signal processors ("DSPs"), application-specific integrated circuits ("ASICs"), field-programmable gate arrays ("FPGAs"), etc.

In some embodiments, data obtained or generated by the computing system 100 may be stored or transmitted via a data transmission medium, e.g., a signal on a communications link via the network interface 150. Various communications links may be used, e.g., the Internet, a local area network, a wide area network, or a point-to-point dial-up connection. Thus, computer-readable media can include computer-readable storage media, e.g., non-transitory media, and computer-readable transmission media. As shown in the example computing system 100, some embodiments may control a quantum annealer 111 by sending messages to the quantum controller 112 via a system interconnect 130. Alternatively, or in addition, some embodiments may control a quantum annealer by sending messages over a network, such as by sending messages over a network interface to control a quantum annealer.

In some embodiments, the quantum controller 112 or the quantum processor 114 can be isolated from an external environment. For example, a set of qubits of the quantum processor 114 or other elements of the quantum processor 114 may be shielded from external magnetic fields, electric fields, heat, noise, vibrations, or other perturbations that may add or remove energy from the quantum processor 114. The quantum processor 114 may include programmable elements such as qubits, couplers, etc.

Some embodiments may use the quantum controller 112 to implement an Ising model with an underlying Hamiltonian. Evolving the state of a quantum processor 114 represented by the Hamiltonian may provide lower-energy samples that map to optimized solutions represented by the Ising model, where the lower-energy samples may be represented as a set of vectors, arrays, object properties, other data structures. For example, some embodiments may implement a Hamiltonian that is represented by Equation E.1, where H may represent a total energy of a state, where $Z_k$ and $Z_l$ may represent spin state values for a qubit, and where the coupling parameter $J_{kl}$ is a model parameter that represents an energy change associated with an interaction between the state of a k-th element and the state of a l-th element, and where the field value $h_k$ may represent an field value parameter associated with the state of the k-th element:

$$H = \Sigma_{k<l} J_{kl} Z_k Z_l + \Sigma_k h_k Z_k \tag{E.1}$$

In some embodiments, the quantum controller 112 may configure the quantum processor 114 and permit the state of the quantum processor 114 to evolve to an updated set of states, which may be described as annealer output samples of the quantum processor 114. For example, the quantum controller 112 may control the qubits of the quantum processor 114 or couplers of the quantum processor 114 to change a temperature, field strength, coupling strength, etc. In some embodiments, the states of the quantum processor 114 may be read by the readout system 116. The readout system 116 may then provide results read from the quantum processor 114 to the classical processor 142 or other components of the computing system 100. For example, the readout system 116 may provide the resulting spin state $Z_k$ for each k-th qubit of a set of qubits.

Some embodiments may then provide the output provided by the readout system 116 to an oracle to determine a comparison value, where the comparison value may then be used to train an Ising model or other model represented by a Hamiltonian. For example, some embodiments may use an energy difference conditioning value as a comparison value, where some embodiments may use the classical processor 142 to determine the energy difference conditioning value. Various embodiments may use different forms of an energy difference conditioning value to train a model. In some embodiments, the energy difference conditioning value may be based on a product of state values of pairwise combinations of indices k and l of a quantum annealer output, $Z_k Z_l$. For example, after evolving the state of a quantum annealer to obtain a set of samples, some embodiments may determine a first subset of samples where the product of state values indexed by the pairwise combination of indices is positive for each sample of the first subset. Similarly, some embodiments may determine a second subset of samples where the product of state values indexed by the pairwise combination of indices is negative for each sample of the first subset.

After segmenting a set of samples into subsets of samples, some embodiments may then provide subsets of samples to an oracle, such as an oracle being executed by the classical processor 142 to provide subsets of oracle outputs. Some embodiments may then use the expectations of oracle outputs to determine comparison values. For example, some embodiments may determine a first expectation based on the first set of oracle outputs associated with a first set of state values and a second expectation based on a second set of oracle outputs associated with a second set of state values. Some embodiments may determine a comparison value based on the expectations, where the comparison value may include a difference, a ratio, etc. For example, some embodiments may determine an energy difference conditioning value $V(Z_k Z_l)$ shown in Equation E.2 below, where $V(Z_k Z_l)$ is shown as a difference of the conditional energy terms $\Phi(R|Z_k Z_l=1)$ and $\Phi(R|Z_k Z_l=-1)$, and where $Z_k$ and $Z_l$ may represent state values for the k-th qubit and l-th qubit, respectively:

$$V(Z_k Z_l) = \Phi(R|Z_k Z_l=1) - \Phi(R|Z_k Z_l=-1) \tag{E.2}$$

Furthermore, the conditional energy terms $\Phi(R|Z_k Z_l=1)$ and $\Phi(R|Z_k Z_l=-1)$ shown above for Equation E.2 may be defined by Equation E.3 below, where O may represent an operator, $\delta_{O(R_i),\alpha}$ may represent a Kronecker Delta function such that $\delta_{k,k}=1$ and $\delta_{k,l\neq k}=0$, and where the energy expectation term $\Phi(R_i)$, may be determined by an oracle function that provides an output value in response to receiving $R_i$ as an input:

$$\Phi(R|O=a) = \frac{1}{\sum_{i=1}^{m} \delta_{O(R_i),a}} \sum_{i=1}^{m} \Phi(R_i) \delta_{O(R_i),a} \tag{E.3}$$

For example, some embodiments may train a Hamiltonian based on update operations S.1 and S.2 below, where the coupling parameter $J_{kl}$ and the where the field value $h_k$ may be updated based on their previous respective values, the energy difference conditioning value $V(Z_k Z_l)$, and a learning rate parameter $\eta$:

$$J_{kl} \rightarrow J_{kl} - \eta V(Z_k Z_l) \tag{S.1}$$

$$h_k \rightarrow h_k - \eta V(Z_k) \tag{S.2}$$

Some embodiments may perform operations to update parameters one at a time. For example, some embodiments may perform a first set of annealing operations using the quantum processor 114, determine a first comparison value based on a first set of samples read by the readout system 116, and then update the coupling parameter $J_{kl}$ based on the first comparison value. Some embodiments may then perform a second set of annealing operations, determine a second comparison value based on a second set of samples read by the readout system 116, and then update the field value $h_k$ based on the second comparison value.

In some embodiments, one or more of the qubits may be further configured with a set of offset values. Applying offset values may cause qubits in the quantum processor 114 to experience different local fields that may result in different rates of qubit state changes. Some embodiments may train a model by configuring the anneal offsets based on a comparison value. For example, some embodiments may update a k-th anneal offset $\delta s_k$ for the k-th qubit in accordance with update operation S.3 below, where the learning rate parameter $\eta'$ may be the same or different from the learning rate parameter shown in update operations S.1 and S.2 above, and where $Z_k(0)$ may represent an initial state value:

$$\delta s_k \rightarrow \delta s_k + \eta' V(Z_k Z_k(0)) \tag{S.3}$$

Figure 2:
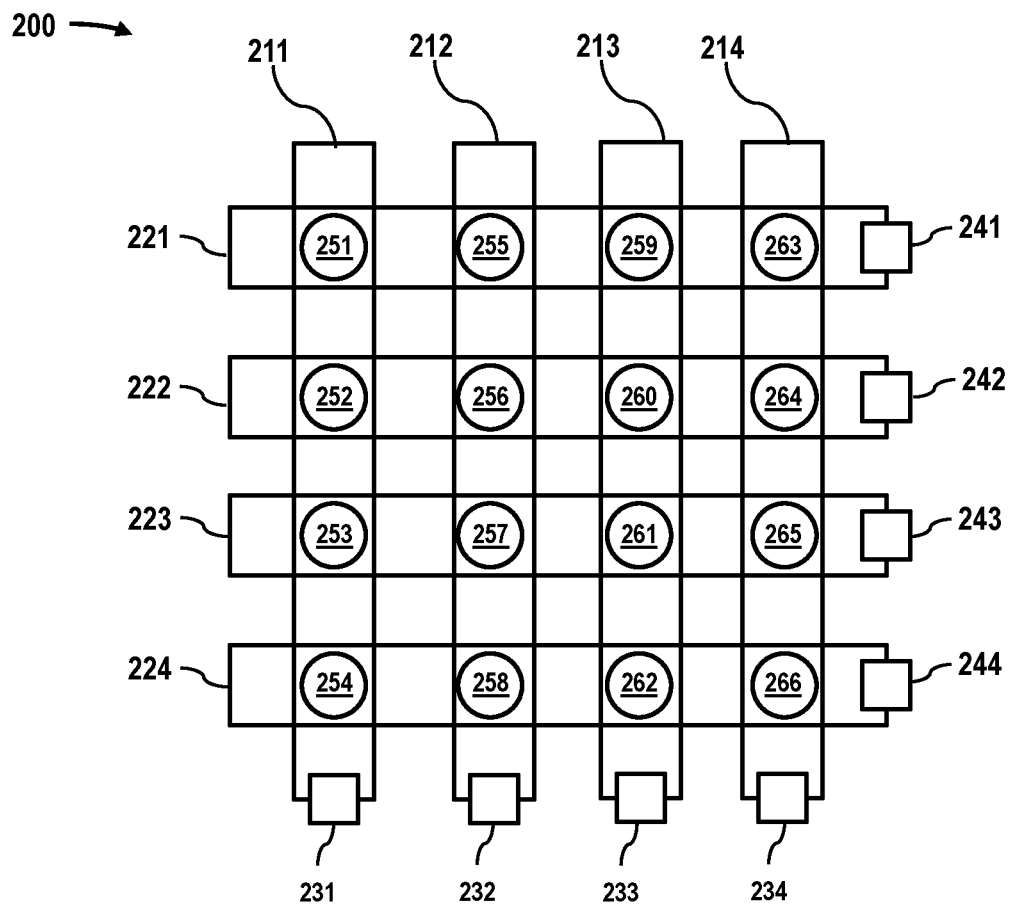
FIG. 2 shows a schematic diagram of a set of qubits used in a quantum processor, in accordance with one or more embodiments.

FIG. 2 shows a schematic diagram of a set of qubits used in a quantum processor, in accordance with one or more embodiments. The set of qubits 200 may be used in a quantum annealer and is shown to include eight qubits, where the eight qubits include a vertical subset of qubits 211-214 and a horizontal subset of qubits 221-224. Each qubit, such as the qubit 211, may include a superconductive path. Furthermore, while the qubits 211-214 and 221-224 are shown along rectangular paths, other implementations of qubits may include qubits with others shapes for their superconductive paths. For example, some embodiments may include qubits that have an oval shape, a trapezoidal shape, a rectangular shape having rounded edges, an amorphous shape, etc. During the operation of the set of qubits 200, different field offsets may be applied to each qubit such that each qubit of the set of qubits 200 may fluctuate between states at different rates or freeze at different rates.

The qubits 211-214 may be interrupted by junctions 231-234. Similarly, the qubits for 221-224 may be interrupted by junctions 241-244. In some embodiments, the subset of qubits 211-214 may be communicatively coupled with the subset of qubits 221-224. For example, the qubit 211 may be coupled with each qubit of the subset of qubits 221-224 via the set of junctions 251-254. Similarly, each of the other qubits of the subset of qubits 212-214 may be coupled with each qubit of the subset of qubits 221-224 via the set of junctions 255-266. In some embodiments, each of the couplers 251-266 may be strong couplers that are substantially similar with respect to their coupling of different qubits. Alternatively, some or all of the couplers 251-256 may vary in strength with respect to each other.

As described elsewhere in this disclosure, some embodiments may couple different qubits to model variables. For example, the qubit 211 may be mapped to a first variable of an optimization problem, and the qubit 212-213 may be mapped to a second variable. The set of qubits 200 may also include output devices 201-208, where each device may be configured to be coupled to a corresponding qubit. For example, as shown in the set of qubits 200, the subset of qubits 211-214 may each be coupled with an output device of the subset of output devices 201-204. Similarly, the subset of qubits 221-224 may each be coupled with an output device of the subset of output devices 205-208. Each output device of the output devices 201-208 may provide the final state of its corresponding qubit, where the final state may be represented as a bit string. For example, after being provided with an initial set of configuration parameters used to configure the coupling of different qubits to represent relationships between variables in a model, some embodiments may perform quantum annealing methods described in this disclosure to determine outputs.

Figure 3:
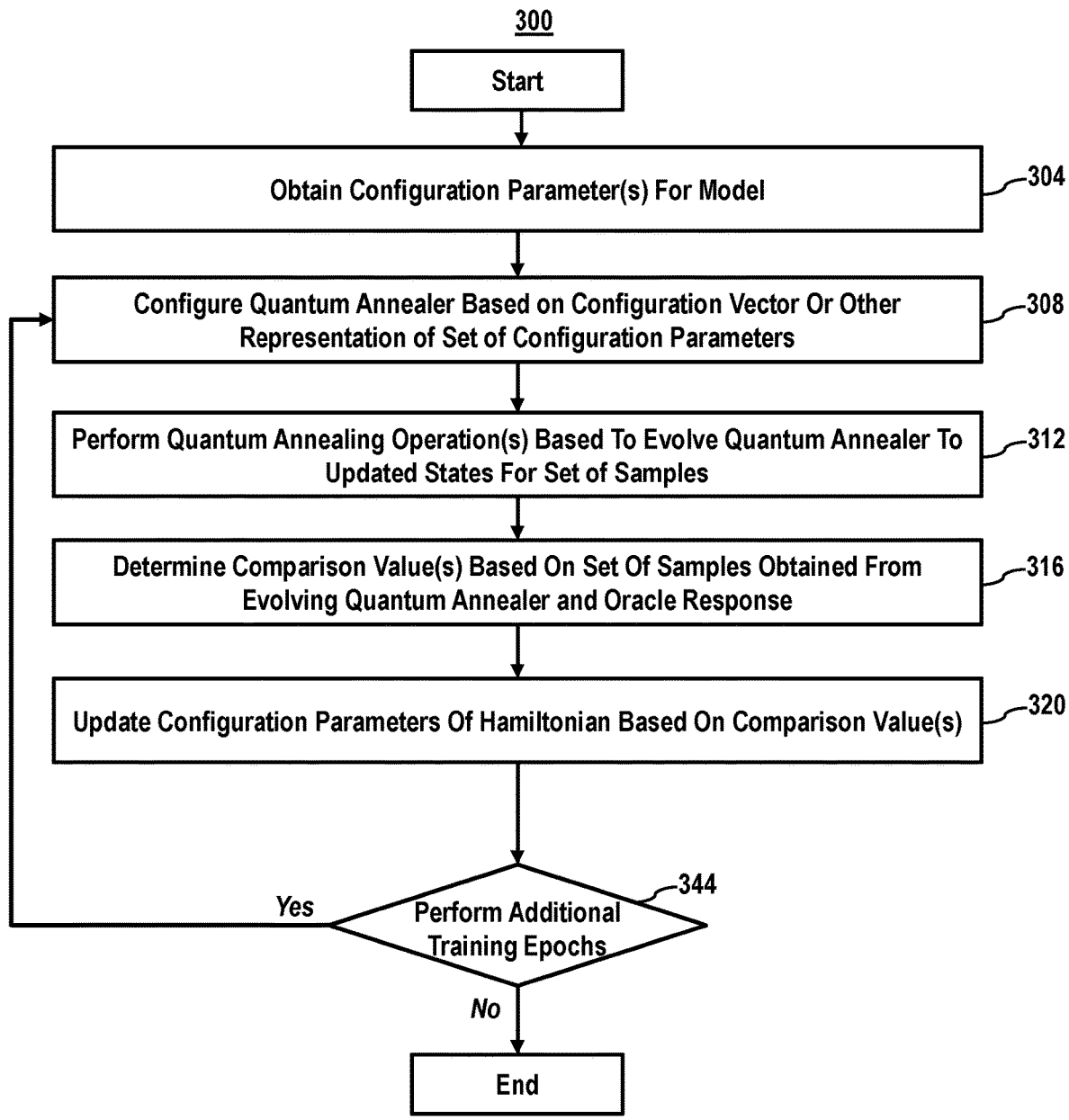
FIG. 3 shows flowchart for determining model parameters via training with a quantum annealer and an oracle, in accordance with one or more embodiments.

FIG. 3 shows flowchart for determining model parameters via training with a quantum annealer and an oracle, in accordance with one or more embodiments. Some embodiments may obtain a set of configuration parameters for a model, as indicated by block 304. The configuration parameters may be obtained from a database, user-entered values, etc. For example, some embodiments may obtain an initial set of configuration parameters for a Hamiltonian used to represent an Ising model. Furthermore, some embodiments may obtain an initial state for the Hamiltonian or other representation of a model. In some embodiments, the initial state may represent an ansatz for an Ising model.

Some embodiments may obtain a set of configuration parameters or an initial set of state values as a preset default stored in a record in association with the selected model. For example, some embodiments may obtain a set of coupling parameters J, a set of field values h, and a vector consisting of "1" or "0" to represent an initial state Z. The initial state Z may be represented as a vector consisting only of "1" (e.g., "[1, 1, 1, 1, 1]"), a vector consisting only of "0" (e.g., "[0, 0, 0, 0, 0]"), or a vector consisting of some mixture of "1" and "0." Furthermore, some embodiments may obtain an initial set of values representing a low-energy configuration of a Hamiltonian or other underlying model. Alternatively, or in addition, some embodiments may obtain a vector described in this disclosure for use as an initial set of vectors via a network interface. For example, some embodiments may obtain a vector representing a state via a message sent over a local area network or retrieved from an encrypted database. Alternatively, or in addition, some embodiments may obtain the initial set of values from a user via a text entry box, a selection from a set of vectors in a UI element, a terminal entry, etc.

Some embodiments may obtain a set of outputs of previous executions of a quantum annealer or an oracle to determine a set of initial state values. For example, some embodiments may obtain a set of samples using a quantum annealer and determine an initial set of values to use as an initial state for a later time based on the set of samples. Some embodiments may determine the initial set of values by determining an expectation for each initial qubit value based on the corresponding qubit values from the set of samples. Alternatively, some embodiments may determine the initial set of values by randomly selecting a sample from the set of samples provided by a quantum annealer, selecting a predetermined sample (e.g., the most recent sample provided by a quantum annealer), etc.

Some embodiments may configure a learning model using the quantum annealer based on a configuration vector or other representation of a set of configuration parameters, as indicated by block 308. For example, some embodiments may set the energy states of a set of qubits by manipulating the physical fields, temperatures, or other physical states of a set of qubits based on a set of configuration parameters such as the configuration variable $J_{kl}$ or $h_k$ for each qubit k in a set of qubits. Furthermore, some embodiments may initialize an epoch for quantum annealing without providing an initial state to a set of qubits.

Some embodiments may perform operations to remap qubits based on the relationship between different variables represented by an optimization problem. For example, some embodiments may randomly map a first variable to a first set of qubits, randomly map a second variable to a second set of qubits, etc. Alternatively, some embodiments may perform a first set of annealing operations using a quantum annealer to determine correlated or anti-correlated variables. Determining the correlation of variables may include determining correlation values between variables and then determining which correlation criteria are satisfied based on the correlation values. Some embodiments may then remap qubits based on the highly correlated or anti-correlated variables to qubits that are physically close to each other in a simulation and then perform a second set of annealing operations for a greater number of epochs than the first annealing operation. For example, some embodiments may determine that a first variable and a second variable are highly correlated, where being highly correlated may include having the greatest correlation value or having a correlation value that is greater than a correlation threshold. Some embodiments may then select a pair of qubits that are adjacent to each other or otherwise physically within a proximity threshold of each other and map the first and second variables to the pair of qubits.

Some embodiments may perform a set of quantum operations to evolve state for a quantum annealer determine updated states of a set of samples based on the configuration parameters, as indicated by block 312. Some embodiments may use qubits of a superconducting quantum processor coupled to each other via a set of couplers to evolve a quantum system from an initial state to a final state using an adiabatic evolution for each epoch of an annealing operation.

Some embodiments may perform reverse annealing operations (i.e., "backwards annealing") to determine one or more samples that may result in a lower energy than the energy for an initially-provided state. Some embodiments may perform reverse annealing operations by setting the state of a set of qubits to represent a first low energy state and then permitting the set of qubits to fluctuate to explore a sample space. For example, some embodiments may increase the level of quantum fluctuations or permit thermal dissipation to explore a sample space to seek out additional states associated with energy values that are lower than that of the first low energy state.

Some embodiments may perform reverse annealing operations based on a reversal distance. For example, some embodiments may start in the s=1 state, where s may be a time-dependent control parameter that is positively correlated with time, and where the s=1 state may represent a possible final state. When performing a reverse annealing operation, some embodiments may reduce the value of s until s is equal to the reversal distance s*. Some embodiments may then pause the state of the set of qubits for a duration i and then increase the value of time-dependent control parameter s until s is equal to one again. For example, some embodiments may linearly decrease the value of s from one to s*, where s* may be a value greater than zero, hold the value of s at the reversal distance s* for a period of time τ, and then linearly increase the value of s from s* to one. As described elsewhere in this disclosure, deceasing s may be correlated with an associated decrease in a transverse field strength. For example, linearly decreasing s may manifest by linearly decreasing a field strength. Furthermore, some embodiments may perform one or more updates to s in a low-temperature dissipation environment instead of an adiabatic environment. By providing a means of energy dissipation, some embodiments may increase the likelihood that the final energy state of a set of qubits after a reverse annealing operation may be different from the initial energy state of the set of qubits before changing the value of s.

Some embodiments may perform operations to determine a set of second-order derivatives of the energy of a Hamiltonian with respect to a thermal distribution parameter α, where the thermal distribution parameter may represent a value normalized by a temperature value. Some embodiments may represent the second-order derivatives in the form of a Hessian matrix or another set of values. By determining a Hessian or other representation of the second-order derivatives, some embodiments may determine regions of interest with respect to a state vector, where the regions of interest may represent local or global extrema with respect to energy. For example, some embodiments may then use the Hessian or another representation of the second-order derivatives to determine that a local minimum energy state has been achieved, where the local minimum energy state may be correlated with a local minimum likelihood of state change or a global minimum likelihood of state change.

To determine a Hessian, some embodiments may determine second-order derivatives of energy terms with respect to a measure of average energy. Some embodiments may represent the self-correlation terms of a Hessian (i.e., the diagonal terms of a Hessian) in Equation E.4 below, where T may represent a temperature value and $\omega_0$ may represent a configuration weight parameter that is correlated with a default expected ratio of qubit states:

$$\frac{\partial^2 \Phi}{\partial \alpha^2} = \frac{2}{T^2} V(O) \left[ 2\frac{\omega_0^3}{(1+\omega_0)^3} - 3\frac{\omega_0^2}{(1+\omega_0)^2} + \frac{\omega_0}{1+\omega_0} \right] \quad (E.4)$$

Furthermore, some embodiments may determine the two-element correlation terms of the Hessian (i.e., the non-diagonal terms of the Hessian) in Equation E.5 below, where the functions $f$ and $g$ may be represented by Equations E.6 and E.7 below, respectively, and where P may represent a partition function, and where the configuration weight parameters $\omega_0^{(++)}$, $\omega_0^{(+-)}$, and $\omega_0^{(-+)}$ may each represent different configuration weight parameters corresponding with different state configurations, and where $\alpha_1$ and $\alpha_2$ may represent thermal distribution parameters for different qubits:

$$\frac{\partial^2 \Phi}{\partial \alpha_1 \partial \alpha_2}\bigg|_{\alpha_1,\alpha_2=0} = \frac{\Phi_{++}}{PT^2} g(\omega_0^{(++)}) + \frac{\Phi}{T^2} \left( \frac{2}{P^2} [f(\omega_0^{(+-)}) + f(\omega_0^{(++)})][f(\omega_0^{(-+)}) + f(\omega_0^{(++)})] + \frac{1}{P} g(\omega_0^{(++)}) \right) \quad (E.5)$$

$$f(x) = \frac{x}{1+x} - \frac{x^2}{(1+x)^2} \quad (E.6)$$

$$g(x) = 2\frac{x^3}{(1+x)^3} - 3\frac{x^2}{(1+x)^2} + \frac{x}{1+x} \quad (E.7)$$

In some embodiments, the partition function P may itself be represented as a function of configuration parameters and the thermal distribution parameter α. For example, some embodiments may implement the partition function P shown in Equation E.8 below, where the configuration weight values $\omega^{(+-)}$, $\omega^{(-+)}$, and $\omega^{(++)}$ are shown in the corresponding Equations E.9, E.10, and E.11, respectively:

$$P = \frac{\omega^{(+-)}}{\omega^{(+-)}+1} + \frac{\omega^{(-+)}}{\omega^{(-+)}+1} + \frac{\omega^{(++)}}{\omega^{(++)}+1} + 1 \quad (E.8)$$

$$\omega^{(+-)}(\alpha_1) = \omega_0^{(+-)} \exp\left[\frac{\alpha_1}{T}\right] \quad (E.9)$$

$$\omega^{(-+)}(\alpha_2) = \omega_0^{(-+)} \exp\left[\frac{\alpha_2}{T}\right] \quad (E.10)$$

$$\omega^{(++)}(\alpha_1, \alpha_2) = \omega_0^{(++)} \exp\left[\frac{\alpha_1+\alpha_2}{T}\right] \quad (E.11)$$

Some embodiments may determine a set of comparison values based on the set of samples obtained from evolving the quantum annealer and an oracle response, as indicated by block 316. As used in this disclosure, the comparison value between a set of samples and an oracle response may represent an indication of the degree to which the set of samples and the oracle response match. The comparison value may be calculated in various ways, such as by determining energy values based on states and then comparing the energy values, determining a vector of differences between an expected output state and the output state provided by a quantum annealer, determining an output of a function that takes both the oracle response and a sample state as inputs, etc. For example, some embodiments may compute an energy difference conditioning value based on a difference between a first conditional energy term representing energy for a first state and a second conditional energy term representing energy for a second state.

In some embodiments, a significant number of samples may not be obtainable for values of an operator. Some embodiments may account for this issue and perform operations to permit learning even when insufficient samples may be obtained. Such operations may include determining a minimum number of samples based on qubit parameters.

Some embodiments may then set the energy difference conditioning value V(O) for an operator O to be equal to zero unless the number of samples is greater than the minimum number of samples. For example, some embodiments may first determine a minimum number of samples n(O) indicated by Equation E.12 based on the sum of between a first sum $\Sigma_{i=1}^{m} \delta_{O(R_i),-1}$ and a second sum $\Sigma_{i=1}^{m} \delta_{O(R_i),1}$. Some embodiments may then determine the energy difference V(O) based on this minimum number of samples as represented by Equation E.13 below, where the energy difference conditioning value V(O) is set to zero if the minimum number of samples is less than a sample count threshold $n_{min}$:

$$n(O) = \min\left[\sum_{i=1}^{m} \delta_{O(R_i),-1}, \sum_{i=1}^{m} \delta_{O(R_i),1}\right] \quad (E.12)$$

$$V(O) = \begin{cases} \Phi(R \mid O = 1) - \Phi(R \mid O = -1) & n(O) > n_{min} \\ 0 & \text{otherwise} \end{cases} \quad (E.13)$$

Some embodiments may set the sample count threshold $n_{min}$ to be a value less than a ratio of the threshold m, where m may be the total number of solutions output by a quantum annealer. For example, the minimum number of samples is greater than a first ratio of m, where the first ratio may be less than or equal to m/2, less than or equal to m/10, less than or equal to m/100, or less than or equal to another ratio of m. Alternatively, or in addition, some embodiments may set the sample count threshold $n_{min}$ to a predefined number, such as a number less than or equal to 1000, a number less than or equal to 100, a number less than or equal to 10, a number less than or equal to 5, or some other number. After determining that a count of samples is less than a sample count threshold, some embodiments may then generate a warning via a graphic user interface (GUI), add a message to an output log, or perform other operations to indicate that the sample count threshold has been violated. For example, some embodiments may determine whether a minimum number of samples is less than the sample count threshold and provide a warning to a user via a GUI based on a determination that the total number of samples is less than the sample count threshold $n_{min}$.

Some embodiments may update a set of configuration parameters based on the set of comparison values, as indicated by block 320. The set of configuration parameters may include a set of coupling parameters of a Hamiltonian, a set of field value parameters of a Hamiltonian, a set of anneal offsets, or other parameters. Some embodiments may be configured to implement a learning model that updates terms of an underlying operator based on the results of energy difference operators. For example, as described elsewhere in this disclosure, some embodiments may implement an Ising model with an underlying Hamiltonian such that the Hamiltonian may include a first Ising model parameter representing a coupling parameter associated with a pair of qubits, and where the underlying Hamiltonian may also include a field value parameter representing an energy change as a result of a field (e.g., a magnetic field, an electric field, etc.). Based on this model, some embodiments may train a Hamiltonian based on update operations represented by update operations S.1 and S.2 shown above.

In many cases, the coupling parameter $J_{kl}$ or the field value parameter $h_k$ of a Hamiltonian H may be too strong and impede learning. Some embodiments may account for this by using a relaxation factor as a weight when updating a coupling parameter $J_{kl}$ or a field value $h_k$, such as by multiplying the coupling parameter or the field parameter by the relaxation factor. Furthermore, some embodiments may apply the relaxation factor for a coupling parameter or a field value parameter when a sample count associated with a pair of indices of the coupling parameter is less than a minimum sample threshold. For example, some embodiments may determine that a sample count for a set of samples associated with a pair of indices is less than the sample count threshold $n_{min}$. In response, some embodiments may update the coupling parameter $J_{kl}$ and the field value $h_k$ for qubits k and l using operations described by update operations (S.4) and (S.5) below, which show that $J_{kl}$ may be updated by multiplying a previous value of $J_{kl}$ with a relaxation factor $\xi$ and that that $h_k$ may be updated by multiplying a previous value of $h_k$ with the relaxation factor $\xi$, where the relaxation factor $\xi$ may be inclusively or exclusively between zero and one:

$$J_{kl} \to \xi J_{kl} \quad (S.4)$$

$$h_k \to \xi h_k \quad (S.5)$$

Some embodiments may apply more sophisticated learning operations to the Hamiltonian parameters. For example, some embodiments may update parameters based on a configuration weight $\omega_0$. As described elsewhere, the configuration weight may be correlated with a default expected ratio of qubit states. Some embodiments may determine the configuration weight $\omega_0$ or the energy difference conditioning parameter V(O) by sampling a Hamiltonian. Some embodiments may then update parameters based on the determined configuration weight and energy difference conditioning parameters. In some embodiments, the configuration weight $\omega_0$ may be used in one or more ratios used to determine a coupling parameter or a field value parameter such that the configuration weight may be part of both the numerator and denominator of the one or more ratios. For example, some embodiments may implement an energy update in accordance with the update operations represented by update operations S.6 and S.7 shown below, where the configuration weight $\omega_0$ may be used in both the numerator and denominator of a set of ratios used to determine $J_{kl}$ and $h_k$:

$$J_{kl} \to J_{kl} - \eta\left(\frac{\omega_0(Z_k Z_l)}{1 + \omega_0(Z_k Z_l)} - \frac{\omega_0(Z_k Z_l)^2}{(1 + \omega_0(Z_k Z_l))^2}\right) V(Z_k Z_l) \quad (S.6)$$

$$h_k \to h_k - \eta\left(\frac{\omega_0(Z_k)}{1 + \omega_0(Z_k)} - \frac{\omega_0(Z_k)^2}{(1 + \omega_0(Z_k))^2}\right) V(Z_k) \quad (S.7)$$

While some embodiments may be tasked with solving optimization problems that can be modeled with binary values, many models may be mixed such that variables of the model may represent a continuous value. However, the discrete outputs of a quantum annealer may make it difficult to map continuous variables to such outputs. Some embodiments overcome this issue by mapping an expectation of qubit states for a qubit k to a continuous variable, where the expectation may be used as an approximation of a continuous variable. Some embodiments may accommodate such operations by updating a learning rule for the field value to incorporate an expectation of a qubit state $\langle Z_k \rangle$. For example, some embodiments may update the coupling term $J_{kl}$ and field term $h_k$ of a Hamiltonian using the update operations S.8 and S.9 below, where the expectation $\langle Z_k \rangle$ may be defined in Equation E.14:

$$J_{kl} \to J_{kl} - \eta\left(\langle Z_l\rangle\left(\frac{\omega_0(Z_k)}{1+\omega_0(Z_k)} - \frac{\omega_0(Z_k)^2}{(1+\omega_0(Z_k))^2}\right)V(Z_k) + \frac{2\langle Z_k\rangle}{2+\omega_0(Z_l)+\omega_0(Z_l)^{-1}}\frac{\partial^2\Phi}{\partial\langle Z\rangle_l}\right) \quad \text{(S.8)}$$

$$h_k \to h_k - \eta \frac{2}{2+\omega_0(Z_k)+\omega_0(Z_k)^{-1}} \frac{\partial\Phi}{\partial\langle Z\rangle_k} \quad \text{(S.9)}$$

$$\langle Z_k\rangle = \frac{2\omega_0 \exp\left[\frac{\alpha}{T}\right]}{1+\omega_0 \exp\left[\frac{\alpha}{T}\right]} - 1 = \frac{2}{\omega_0^{-1}\exp\left[-\frac{\alpha}{T}\right]+1} - 1 \quad \text{(E.14)}$$

Some embodiments may perform operations to account for non-binary categorical variables represented as integers. For example, a variable may represent one of the five types of hexane isomers. Some embodiments may represent such a variable using minor embedding. However, as described elsewhere in this disclosure, the binary nature of a qubit output may make representations of non-binary variables more difficult. Furthermore, conventional representations of categorical information via bit representations may involve multiple bit flips, which may be problematic when using real-world quantum annealers due to the complications of linking multiple qubits in such a manner.

Some embodiments may overcome such issues by representing categorical variables with a domain-wall representation. For example, some embodiments may use a domain-wall representation described in Chancellor et al. (Nicholas Chancellor. Domain wall encoding of discrete variables for quantum annealing and QAOA. Quantum Science and Technology, 4 (4):045004, August 2019.), which is incorporated herein by reference. Some embodiments may apply a set of constraints to qubits of a quantum anneal or to accommodate the domain-wall variable. For example, some embodiments may apply a ferromagnetic chain satisfying a maximum strength threshold or a boundary field, where the ferromagnetic chain or boundary field may remain unchanged by training operations. Some embodiments may further perform operations to handle the possibility of constraint violation. For example, some embodiments may perform random or pseudorandom operations to select a value and add the value as an additional penalty term for an objective function used to train a quantum annealer. In addition, some embodiments may ignore this penalty when comparing samples for optimality.

Some embodiments may set a maximum change threshold for the energy expectation of a set of solutions $\Phi$ between different epochs. Some embodiments may implement a condition that if the maximum change threshold is exceeded, the relaxation factor or the learning rate parameter may be reduced. For example, some embodiments may determine that an energy expectation is greater than the threshold change for a total energy change of a first epoch. In response, some embodiments may multiply a learning rate parameter or a relaxation factor by 0.5 or another value less than one and repeat the simulation for that first epoch. By decreasing the relaxation factor or another parameter, some embodiments may reduce a loss in solution quality or decrease the number of epochs needed by a quantum annealer to achieve an optimal state.

Some embodiments may perform additional operations to use qubits as hidden units, where the value of the qubit may represent higher-order interactions between different variables. Some embodiments may choose an initialization value for these qubits representing hidden units. For example, some embodiments may select a subset of qubits to represent higher-order interactions between different variables and initialize the qubits with the |0⟩ state. Furthermore, some embodiments may reduce computational load or other uses of computing resources by setting an upper limit to the anneal offsets for these hidden unit qubits or otherwise setting the anneal offsets to be equal to zero. By setting an upper limit to an anneal offset, some embodiments may reduce freezing probabilities for qubits representing the higher-order interactions.

As described elsewhere in this disclosure, some embodiments may be used to optimize mixed variable models such that some of the variables of the model are binary and other variables of the model are continuous. Some embodiments may use anneal offsets to permit a mixed variable system such that strong fluctuations may be preserved within a qubit that is mapped to a continuous variable while binary variables may be permitted to freeze to a corresponding value. For example, some embodiments may apply a strong negative anneal offset to a selected qubit that causes the selected qubit to remain in a superposition while the neighboring qubits of the selected qubit freeze to a binary value.

Some embodiments may update anneal offsets based on oracle outputs, where the oracle outputs are determined based on annealer outputs. For example, some embodiments may update an anneal offset $\delta s_k$ for the k-th qubit of a set of qubits of a quantum processor. The anneal offset may determine the likelihood of the k-th qubit being changed from a previous state to a different state. For example, a greater anneal offset of a qubit may be correlated with a reduced probability of the qubit changing its state, where global increases in the offset values may result in a system that does not have a high likelihood of changing state. For example, some embodiments may update a set of anneal offsets based on an initial state, a comparison value, and a first learning rate parameter. In some embodiments, the first learning rate parameter may be the same or different from the learning rate parameters used to determine a coupling parameter, field value parameter, or reversal distance.

Some embodiments may train offsets by comparing different sample results. In some embodiments, comparing two sample results may include comparing the respective coupling parameters and field values. Some embodiments may perform this comparison by determining a likelihood for an individual qubit to be sub-optimal with respect to a Hamiltonian. For example, some embodiments may update an offset using an update operation S.10, where the offset $\delta_k$ for qubit k may be determined by a previous value of the offset $\delta_k$, and where a learning rate parameter $\eta'$, and where R represents a state of qubit k, and where $E_k^{excess}$ and $E_k^{loc}$ are further defined below in Equations E.15 and E.16 below, and where $\Theta$ is a Heaviside function defined by Equation E.17 below:

$$\delta_k \to \delta_k + \eta'\Delta s^*[E_k^{excess}(R[s^* + \Delta s^*]) - E_k^{excess}(R[s^*])] \quad \text{(S.10)}$$

$$E_k^{excess}(R) = \frac{1}{|R|}\sum_i E_k^{loc}(R_i)\Theta\left(E_k^{loc}(R_i)\right) \quad \text{(E.15)}$$

$$E_k^{loc}(R_i) = h\langle Z_k\rangle_{R_i} + \sum_l (J_{kl} + J_{lk})\langle Z_k Z_l\rangle_{R_i} \quad \text{(E.16)}$$

$$\Theta(x) = \begin{cases} 1x > 0 \\ 0x < 0 \\ 0.5x = 0 \end{cases} \quad \text{(E.17)}$$

While ideal or simulated quantum computing operations may simulate qubit freezing at the same time, a real-world quantum annealing operation or may face situations where qubits freeze at different times. In some embodiments, training offsets based on different reversal distances may cause the differences in the anneal offsets between adjacent qubits to be equal. While this may be acceptable in some scenarios, such as when the system is at a maximum reversal distance, some embodiments may not directly access the effects of qubit freezing at different times.

Some embodiments may overcome such obstacles by stochastically determining a set of anneal offset differences $\Delta\delta_k$ from a probability distribution, such as a Gaussian distribution. Some embodiments may then configure the quantum annealer twice. During the first configuration, some embodiments may apply fields on the qubits of a quantum annealer based on the respective anneal offsets of the first anneal offsets. After the first configuration, some embodiments may then evolve the state of the quantum annealer to obtain a first set of output samples. During the second configuration, some embodiments may apply a field on the qubit re-configuring the quantum annealer based on a sum of the anneal offset and the anneal offset difference. Some embodiments may then evolve the re-configured quantum annealer to obtain a second set of output samples. Some embodiments may then determine a set of excess energy values and local qubit energy values based on the first set of output samples, coupling parameters, field value parameters, or other Hamiltonian parameters. Similarly, some embodiments may determine a second set of excess energy values and local qubit energy values based on the second set of output samples and Hamiltonian parameters. For example, some embodiments may determine a first set of energy values based on the first set of output samples and a second set of energy values based on the second set of output samples based on Equations E.15 and E.16 above. Some embodiments may then update the anneal offset for the qubit based on a difference between the first energy value and the second energy value. For example, some embodiments may perform update operations during training that determine differences between excess energies $E_k^{excess}(R[\delta+\Delta\delta])$ and $E_k^{excess}(R[\delta])$ via sampling for each qubit. In such operations, some embodiments may perform update operations represented by update operation S.11 below:

$$\delta_k \rightarrow \delta_k + \eta' \Delta \delta_k [E_k^{excess}(R[\delta+\Delta\delta]) - E_k^{excess}(R[\delta])] \quad (S.11)$$

As described elsewhere, some embodiments may perform reverse annealing operations by reducing the strength of a field applied on a set of qubits, holding the qubits at the reduced strength for a period of time, and then returning the strength of the field to its original value. Once the field strength is reduced, a previously-frozen qubit state may fluctuate to a different state, such that returning the field to original higher-value state may result in a different final state. The field strength reduction may be determined based on a reversal distance, s*, where s* is correlated with the reduced field strength based on a known annealing schedule. Some embodiments may adjust the reversal distance s* when performing a reverse annealing operation. Updating the reversal distance may include determining oracle outputs based on states associated with a reversal energy. For example, some embodiments may perform operations to determine the value of the reversal distance s* based on update operation S.12 below, where $\eta''$ may be learning rate parameter different from other learning rate parameters used in this disclosure, and where $\Phi(R[s^*])$ may represent the energy expectation term for states of a qubit after reversing an anneal to a time-dependent control parameter associated with a previous value of s*:

$$s^* \rightarrow s^* - \eta'' \Delta s^* [\Phi[s^* + \Delta s^*] - \Phi(R[s^*])] \quad (S.12)$$

Some embodiments may perform at least three annealing operations per epoch to train the configuration parameters of an underlying operator. For example, for a first epoch, some embodiments may perform a first annealing, a second annealing, and a third annealing. For the first annealing, some embodiments may determine a first set of states using a quantum annealer, provide the first set of states to an oracle to determine a first set of oracle outputs, and update the coupling parameters $J_{kl}$ for each combination of pairs of qubits based on the first set of oracle outputs. For the second annealing, some embodiments may determine a second set of states using the quantum annealer after re-configuring the quantum annealer with the updated coupling parameter, provide the second set of states to the oracle to determine a second set of oracle outputs, and update the field parameters $h_k$ for each qubit k based on the second set of oracle outputs. For the third annealing, some embodiments may determine a third set of states using the quantum annealer after re-configuring the quantum annealer with the updated field parameter, provide the third set of states to the oracle to determine a third set of oracle outputs, and update the anneal offsets $\delta_k$ for each qubit of the quantum annealer and further update the reversal distance s* based on the third set of oracle outputs.

Some embodiments may determine whether to perform additional training epochs, as indicated by block 344. Some embodiments may determine that additional training epochs must be performed based on a determination that a known error value is greater than a threshold error value. For example, some embodiments may require that an energy value computed by an oracle after providing the oracle with samples generated by a quantum annealer be less than an energy threshold. In response to a determination that the energy value provided by the oracle is not less than the energy threshold, some embodiments may determine that an additional training epoch should be performed. Alternatively, some embodiments may determine whether to perform additional training epochs based on a determination that a threshold number of training epochs have been performed. For example, some embodiments may determine that a training epoch has reached an epoch count threshold, where the epoch count threshold may be a number less than 10, a number less than 1000, a number less than 100,000, or some other number. Furthermore, some embodiments may terminate training operations when a target accuracy is achieved. For example, some embodiments may determine that an output of the quantum annealer and oracle outputs are within a target accuracy threshold of each other, and, in response, terminate additional training operations.

Based on a determination that additional training epochs should be performed, operations of the process 300 may proceed to operations described for block 308. Otherwise, operations to train a model using a quantum annealer may end. Furthermore, as described elsewhere in this disclosure, though operations of the process 300 indicate that some embodiments may update a coupling parameter, field value parameter, anneal offset, or reverse distance based on the same sample set provided by a quantum annealer, some embodiments may perform a different set of annealing operations for each parameter being updated per training epoch. For example, some embodiments may perform operations described by blocks 308 to 316 for a first set of annealing operations to update a coupling term of a Hamiltonian. After updating the coupling term of the Hamiltonian, some embodiments may then perform operations described by blocks 308 to 316 for a second set of annealing operations to update a field value parameter of the Hamiltonian. After updating the field value parameter of the Hamiltonian, some embodiments may then perform operations described by blocks 308 to 316 for a third set of annealing operations to update a reversal distance or a set of anneal offsets. After performing the third set of annealing operations, some embodiments may then perform operations described by block 344 to determine whether an additional training epoch should be performed.

Figure 4:
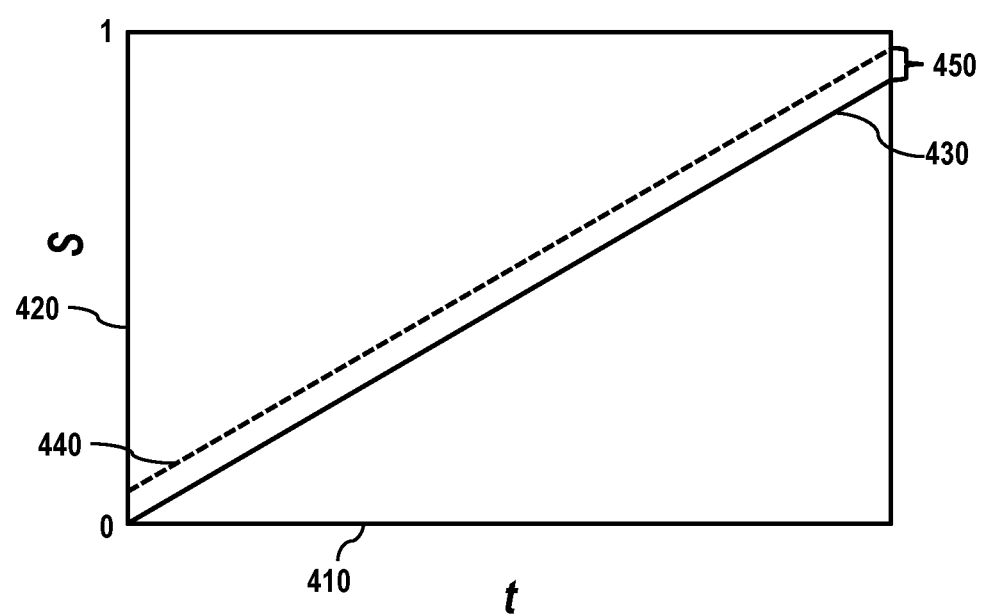
FIG. 4 shows a visual representation depicting the effect of an anneal offset for a forward annealing operation, in accordance with one or more embodiments.

FIG. 4 shows a visual representation depicting the effect of an anneal offset for a forward annealing operation, in accordance with one or more embodiments. The graph 400 depicts the evolution of the time-dependent control parameter s for qubit during a forward annealing operation. The graph 400 includes a horizontal axis 410 representing a time t and a vertical axis 420 representing the time-dependent control parameter s for the qubit. The first line 430 indicates that, during a forward annealing operation, the time-dependent control parameter may increase linearly with time. The second line 440 indicates the effect of an offset 450, where the second line shows that an offset may effectively increase the time-dependent control parameter s by an anneal offset.

Figure 5:
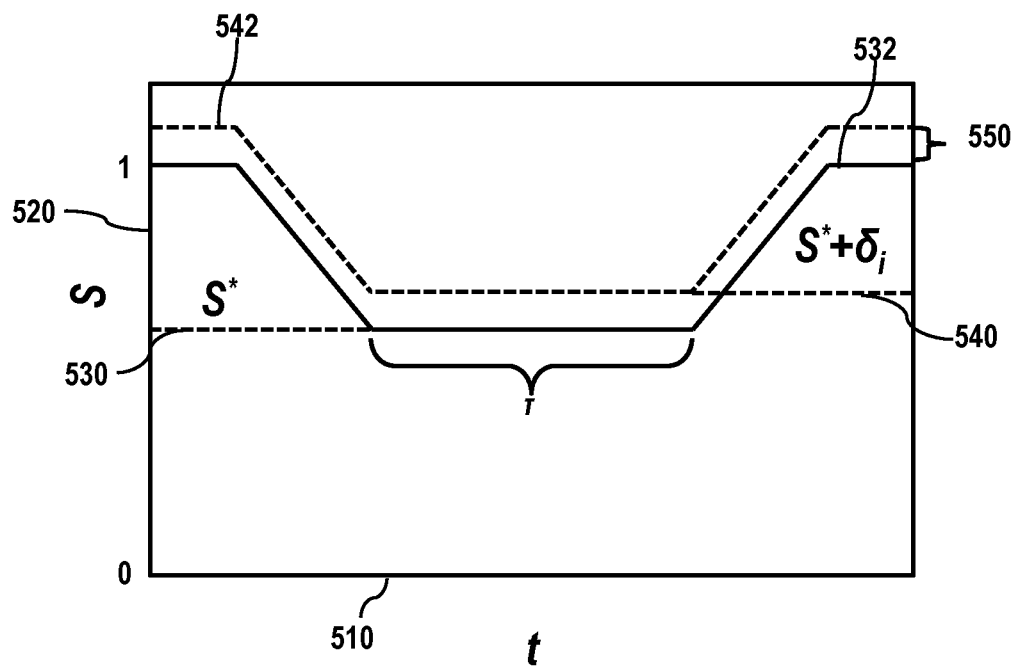
FIG. 5 shows a visual representation depicting the effect of an anneal offset for a reverse annealing operation, in accordance with one or more embodiments.

FIG. 5 shows a visual representation depicting the effect of an anneal offset for a reverse annealing operation, in accordance with one or more embodiments. The graph 500 depicts the evolution of the time-dependent control parameter s for qubit during a reverse annealing operation. The graph 500 includes a horizontal axis 510 representing a time t and a vertical axis 520 representing the time-dependent control parameter s for the qubit. The first curve 532 represents a process by which the time-dependent control parameter s start at an initial value "1" and is then linearly decreased over time until the reversal distance s* is achieved, held for a duration of time $\tau$, and is then linearly increased over time until the time-dependent control parameter s is equal to "1" again. The second curve 542 represents a second process similar to the process represented by the first curve 532. However, the presence of an anneal offset $\delta_i$ results in the effective time-dependent control parameter being equal to its initial value, as indicated by the offset value represented by the gap 550.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

In some embodiments, the various computer systems and subsystems illustrated in FIG. 1, FIG. 2, or otherwise disclosed in this disclosure may include one or more computing devices that are programmed to perform the functions described herein. The computing devices may include one or more electronic storages (e.g., the memory 144), one or more physical processors programmed with one or more computer program instructions, and/or other components. For example, the memory 144 may store a databases, arrays, objects, or other types of data structures that include inputs, configuration parameters, or quantum annealer outputs described in this disclosure.

The computing devices may include communication lines or ports to enable the exchange of information with a set of networks or other computing platforms via wired or wireless techniques. The network may include the Internet, a mobile phone network, a mobile voice or data network (e.g., a 5G or LTE network), a cable network, a public switched telephone network, or other types of communications networks or combinations of communications networks. The network may include one or more communications paths, such as Ethernet, a satellite path, a fiber-optic path, a cable path, a path that supports Internet communications (e.g., IPTV), free-space connections (e.g., for broadcast or other wireless signals), WiFi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

The computing devices described in this disclosure may include electronic storages, such as the memory 144. The electronic storages may include non-transitory storage media that electronically stores information. The storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client devices, or other information that enables the functionality as described herein.

A computing system that includes a set of processors may be programmed to provide information processing capabilities in the computing devices. As such, the set of processors may include one or more of a digital processor, an analog processor, a digital circuit designed to process information, an analog circuit designed to process information, a state machine, and/or other mechanisms for electronically processing information. In some embodiments, the set of processors may include a plurality of processing units, where at least one processor of the plurality of processing units is a classical processor and another processor of the plurality of processing units is a quantum annealing device. As used in this disclosure, the term "classical processor" may include various types of digital processors, such as a set of general-purpose microprocessors that can execute computer program code. The term "classical computing system" may include any computer system that uses the classical processor to performs computing operations. These processing units may be physically located within the same device, or the processors may represent processing functionality of a plurality of devices operating in coordination. The processors may be programmed to execute computer program instructions to perform functions described herein, such as program instructions to perform one or more operations of the process 300. The processors may be programmed to execute computer program instructions by software, hardware, firmware, some combination of software, hardware, or firmware, or other mechanisms for configuring processing capabilities on the processors.

It should be appreciated that the description of the functionality provided by the different subsystems described herein is for illustrative purposes, and is not intended to be limiting, as any of subsystems may provide more or less functionality than is described. For example, one or more of subsystems may be eliminated, and some or all of its functionality may be provided by other ones of subsystems. As another example, additional subsystems may be programmed to perform some or all of the functionality attributed herein to one of subsystems.

With respect to the components of computing devices described in this disclosure, each of these devices may receive content and data via an I/O system, such as the I/O system 148. Each of these devices may also include processors and/or control circuitry to send and receive commands, requests, and other suitable data using the I/O system. The control circuitry may comprise any suitable processing, storage, and/or input/output circuitry. Further, some or all of the computing devices described in this disclosure may include a user input interface and/or user output interface (e.g., a display) for use in receiving and displaying data. For example, input device connected to an I/O system may include a display screen, mouse, a touchpad, a microphone, a keyboard, a camera, etc. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

In some embodiments, the components of a computing system may communicate with each other via a system interconnect, such as the system interconnect 130. The system interconnect may include a set of separate physical buses, point to point connections, bridges, adapters, or controllers. For example, the system interconnect 130 may include a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (12C) bus, or an Institute of Electrical and Electronics Engineers (IEEE) standard 1394 bus, etc.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing steps/operations A, B, C, and D) encompasses both all such attributes or functions being mapped to all such objects and subsets of the attributes or functions being mapped to subsets of the attributes or functions (e.g., both all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors. For example, updating a first value based on a second value may include updating the first value based only on the second value or updating the first value based on both the second value and a third value.

Unless the context clearly indicates otherwise, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified (e.g., with explicit language like "after performing X, performing Y") in contrast to statements that might be improperly argued to imply sequence limitations, (e.g., "performing X on items, performing Y on the X'ed items") used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, indicated otherwise, updating an item may include generating the item or modifying an existing time. Thus, updating a record may include generating a record or modifying the value of already-generated value. Additionally, as used in the specification, "a portion," refers to a part of, or the entirety of (i.e., the entire portion), a given item (e.g., data) unless the context clearly dictates otherwise. Furthermore, a "set" may refer to a singular form or a plural form, such as that a "set of items" may refer to one item or a plurality of items.

The present techniques will be better understood with reference to the following enumerated embodiments:

1. A method comprising: configuring a quantum annealer based on a parameter of a Hamiltonian; performing annealing using the configured quantum annealer to obtain output samples; providing, to an oracle, the output samples to obtain a set of oracle outputs; determining an expectation based on the set of oracle outputs; and updating a parameter indexed by the set of indices based on the expectation and a learning rate parameter.
2. The method of embodiment 1, wherein each sample of the output samples indicates state values of elements of the quantum annealer for a set of indices of the output samples.
3. A method comprising: configuring a quantum annealer based on a set of coupling parameters of a Hamiltonian; performing a quantum annealing using the configured quantum annealer to obtain annealer output samples, wherein each sample of the annealer output samples indicates state values of qubits of the quantum annealer for a set of indices of the annealer output samples; determining a first subset of the annealer output samples, wherein a product of state values indexed by the set of indices is positive for each sample of the first subset; determining a second subset of the annealer output samples, wherein a product of state values indexed by the set of indices is negative for each sample of the second subset; providing, to an oracle, the first and second subsets of annealer output samples to obtain a first set of oracle outputs and a second set of oracle outputs; determining a first expectation based on the first set of oracle outputs and a second expectation based on the second set of oracle outputs; determining a comparison value between the first and second expectations; and updating a coupling parameter indexed by the set of indices based on the comparison value and a learning rate parameter.
4. A method comprising: configuring a quantum annealer based on a set of coupling parameters of a Hamiltonian; performing quantum annealing using the configured quantum annealer to obtain annealer output samples, wherein each sample of the annealer output samples indicates state values of qubits of the quantum annealer; and for each pairwise combination of indices of the annealer output samples: determining a first subset of the annealer output samples, wherein a product of state values indexed by the pairwise combination of indices is positive for each sample of the first subset; determining a second subset of the annealer output samples, wherein a product of state values indexed by the pairwise combination of indices is negative for each sample of the second subset; providing the first subset of annealer output samples to an oracle executing on a classical computing system to obtain a first set of oracle outputs; providing the second subset of annealer output samples to the oracle to obtain a second set of oracle outputs; determining a first expectation based on the first set of oracle outputs and a second expectation based on the second set of oracle outputs; determining a comparison value between the first and second expectations; and updating a coupling parameter indexed by the pairwise combination of indices based on the comparison value and a learning rate parameter.
5. The method of any embodiment of embodiments 1 to 4, the operations further comprising updating the parameter based on a relaxation factor, wherein the relaxation factor is between zero and one.
6. The method of any embodiment of embodiments 1 to 5, the operations further comprising: obtaining a maximum change threshold; and determining whether a change in energy between a first epoch and a second epoch satisfies the maximum change threshold, wherein: the energy indicates a Hamiltonian energy of a set of qubits of the quantum annealer; and updating the parameter comprises updating the parameter in response to a determination that the maximum change threshold is not satisfied.
7. The method of any embodiment of embodiments 1 to 6, the operations further comprising: obtaining a configuration weight; determining a first value based on the configuration weight; determining a second value based on the configuration weight, wherein the second value is greater than the first value; and determining a ratio between the first value and the second value, wherein updating the parameter comprises updating the parameter based on the ratio.
8. The method of any embodiment of embodiments 1 to 7, wherein configuring the quantum annealer comprises: mapping a first subset of qubits of the quantum annealer to variables of the Hamiltonian; mapping a second subset of qubits of the quantum annealer to a set of hidden units representing higher-order interactions between the variables, wherein the second subset of qubits are all initialized to the same state value; and setting an upper limit to anneal offsets of the second subset of qubits.
9. The method of any embodiment of embodiments 1 to 8, the operations further comprising: determining an expectation for a state of a qubit based on a state values of the output samples of the quantum annealer associated with the qubit, wherein a variable is mapped to the qubit; and determining a value of the variable based on the expectation.
10. The method of any embodiment of embodiments 1 to 9, the operations further comprising: obtaining an anneal offset for a qubit of the quantum annealer; selecting an anneal offset difference based on a probability distribution; wherein configuring the quantum annealer comprises configuring the quantum annealer to update a field applied on the qubit based on the anneal offset; evolving the state of the quantum annealer to obtain a first set of output samples; re-configuring the quantum annealer based on a sum of the anneal offset and the anneal offset difference; evolving the re-configured quantum annealer to obtain a second set of output samples; determining a first energy value based on the first set of output samples and the parameter of the Hamiltonian; determining a second energy value based on the second set of output samples and the parameter of the Hamiltonian; and updating the anneal offset for the qubit based on a difference between the first energy value and the second energy value.
11. The method of any embodiment of embodiments 1 to 10, further comprising: obtaining a relaxation factor between zero and one; determining whether a sample count associated with a first pair of indices is less than a sample count threshold, wherein determining the first expectation comprises determining a sample count of the first subset; and in response to a determination that the sample count is less than the sample count threshold, updating a first coupling parameter associated with the first pair of indices by multiplying the first coupling parameter by the relaxation factor.

12. The method of any embodiment of embodiments 1 to 11, further comprising setting the sample count threshold to a value less than m/2, where m is a total count of the annealer output samples.

13. The method of any embodiment of embodiments 1 to 12, further comprising: determining that a first set of variables are correlated based on a determination that the first set of variables satisfy a correlation threshold; and mapping a first qubit and a second qubit of the quantum annealer with the first set of variables based on a determination that the first and second qubits are coupled qubits.

14. The method of any embodiment of embodiments 1 to 13, wherein the learning rate parameter is a first learning rate parameter, further comprising: obtaining a set of anneal offsets; and updating the set of anneal offsets based on a second learning rate parameter, wherein updating the coupling parameter comprises updating the coupling parameter based on the set of anneal offsets.

15. The method of any embodiment of embodiments 1 to 14, wherein configuring the quantum annealer comprises randomly mapping a first qubit of the quantum annealer to a first variable of the Hamiltonian.

16. The method of any embodiment of embodiments 1 to 15, wherein configuring the quantum annealer comprises: determining a correlation value between a first variable of the Hamiltonian and a second variable of the Hamiltonian; determining whether the correlation value satisfies a correlation criterion; in response to a determination that the correlation value satisfies the correlation criterion, selecting a first qubit and a second qubit based on a determination that the first and second qubits within a proximity threshold of each other; and mapping the first qubit to the first variable and the second qubit to the second variable.

17. The method of any embodiment of embodiments 1 to 16, wherein determining whether the correlation value satisfies the correlation criterion comprises determining whether the correlation value is greater than a correlation threshold.

18. The method of any embodiment of embodiments 1 to 17, the operations further comprising: obtaining an initial set of state values representing a local minimum energy state, wherein: configuring the quantum annealer comprises configuring the quantum annealer based on the initial set of state values; performing the quantum annealing comprises performing a set of reverse annealing operations to determine a set of reverse-annealed states; and performing the set of reverse annealing operations comprises reducing a field strength of the quantum annealer based on a reversal distance; determining a third set of oracle outputs based on the set of reverse-annealed states; and updating the reversal distance based on the third set of oracle outputs.

19. The method of any embodiment of embodiments 1 to 18, wherein reducing the field strength of the quantum annealer comprises reducing the field strength linearly with respect to time.

20. The method of any embodiment of embodiments 1 to 19, wherein: the quantum annealing is a first quantum annealing; updating the coupling parameter comprises updating the coupling parameter without updating a field value parameter of the Hamiltonian; the annealer output samples is a first set of annealer output samples; the comparison value is a first comparison value; the operations further comprising: performing a second quantum annealing after configuring the quantum annealer based on the updated coupling parameter to obtain a second set of annealer output samples, wherein each sample of the annealer output samples is associated with a first index value; providing, to the oracle, the second set of annealer output samples to obtain a third set of oracle outputs; and updating a field value parameter indexed by the first index value based on the third set of oracle outputs and the learning rate parameter.

21. The method of any embodiment of embodiments 1 to 20, wherein the learning rate parameter is a first learning rate parameter, further comprising: performing a third quantum annealing after configuring the quantum annealer based on the updated field value parameter to obtain a third set of annealer output samples, wherein each sample of the third set of annealer output samples indicates is associated with the first index value; providing, to the oracle, the third set of annealer output samples to obtain a fourth set of oracle outputs; and updating an anneal offset indexed by the first index value based on the fourth set of oracle outputs and a second learning rate parameter.

22. One or more tangible, non-transitory, machine-readable media storing instructions that, when executed by one or more processors, effectuation operations comprising those of any of embodiments 1-21.

23. A system comprising: one or more processors; and memory storing computer program instructions that, when executed by the one or more processors, cause the one or more processors to effectuate operations comprising those of any of embodiments 1-21.

What is claimed is:

1. A method for training a quantum machine to provide candidate parameters for optimization operations based on oracle outputs comprising:

configuring a quantum annealer based on a set of coupling parameters of a Hamiltonian;

performing quantum annealing using the configured quantum annealer to obtain annealer output samples, wherein each sample of the annealer output samples indicates state values of qubits of the quantum annealer; and for each pairwise combination of indices of the annealer output samples:

determining a first subset of the annealer output samples, wherein a product of state values indexed by the pairwise combination of indices is positive for each sample of the first subset;

determining a second subset of the annealer output samples, wherein a product of state values indexed by the pairwise combination of indices is negative for each sample of the second subset;

providing the first subset of annealer output samples to an oracle executing on a classical computing system to obtain a first set of oracle outputs;

providing the second subset of annealer output samples to the oracle to obtain a second set of oracle outputs;

determining a first expectation based on the first set of oracle outputs and a second expectation based on the second set of oracle outputs;

determining a comparison value between the first and second expectations; and updating a coupling parameter indexed by the pairwise combination of indices based on the comparison value and a learning rate parameter.

2. The method of claim 1, further comprising:
obtaining a relaxation factor between zero and one;
determining whether a sample count associated with a first pair of indices is less than a sample count threshold, wherein determining the first expectation comprises determining a sample count of the first subset; and
in response to a determination that the sample count is less than the sample count threshold, updating a first coupling parameter associated with the first pair of indices by multiplying the first coupling parameter by the relaxation factor.

3. The method of claim 2, further comprising setting the sample count threshold to a value less than m/2, where m is a total count of the annealer output samples.

4. The method of claim 1, further comprising:
determining that a first set of variables are correlated based on a determination that the first set of variables satisfy a correlation threshold; and
mapping a first qubit and a second qubit of the quantum annealer with the first set of variables based on a determination that the first and second qubits are coupled qubits.

5. The method of claim 1, wherein the learning rate parameter is a first learning rate parameter, further comprising:
obtaining a set of anneal offsets; and
updating the set of anneal offsets based on a second learning rate parameter, wherein updating the coupling parameter comprises updating the coupling parameter based on the set of anneal offsets.

6. One or more tangible, non-transitory, machine-readable media storing instructions that, when executed by one or more processors, effectuate operations comprising:
configuring a quantum annealer based on a set of coupling parameters of a Hamiltonian;
performing a quantum annealing using the configured quantum annealer to obtain annealer output samples, wherein each sample of the annealer output samples indicates state values of qubits of the quantum annealer for a set of indices of the annealer output samples;
determining a first subset of the annealer output samples, wherein a product of state values indexed by the set of indices is positive for each sample of the first subset;
determining a second subset of the annealer output samples, wherein a product of state values indexed by the set of indices is negative for each sample of the second subset;
providing, to an oracle, the first and second subsets of annealer output samples to obtain a first set of oracle outputs and a second set of oracle outputs;
determining a first expectation based on the first set of oracle outputs and a second expectation based on the second set of oracle outputs;
determining a comparison value between the first and second expectations; and
updating a coupling parameter indexed by the set of indices based on the comparison value and a learning rate parameter.

7. The media of claim 6, wherein configuring the quantum annealer comprises randomly mapping a first qubit of the quantum annealer to a first variable of the Hamiltonian.

8. The media of claim 6, wherein configuring the quantum annealer comprises:
determining a correlation value between a first variable of the Hamiltonian and a second variable of the Hamiltonian;
determining whether the correlation value satisfies a correlation criterion;
in response to a determination that the correlation value satisfies the correlation criterion, selecting a first qubit and a second qubit based on a determination that the first and second qubits within a proximity threshold of each other; and
mapping the first qubit to the first variable and the second qubit to the second variable.

9. The media of claim 8, wherein determining whether the correlation value satisfies the correlation criterion comprises determining whether the correlation value is greater than a correlation threshold.

10. The media of claim 6, the operations further comprising:
obtaining an initial set of state values representing a local minimum energy state, wherein:
configuring the quantum annealer comprises configuring the quantum annealer based on the initial set of state values;
performing the quantum annealing comprises performing a set of reverse annealing operations to determine a set of reverse-annealed states; and
performing the set of reverse annealing operations comprises reducing a field strength of the quantum annealer based on a reversal distance;
determining a third set of oracle outputs based on the set of reverse-annealed states; and
updating the reversal distance based on the third set of oracle outputs.

11. The media of claim 10, wherein reducing the field strength of the quantum annealer comprises reducing the field strength linearly with respect to time.

12. The media of claim 6, wherein:
the quantum annealing is a first quantum annealing;
updating the coupling parameter comprises updating the coupling parameter without updating a field value parameter of the Hamiltonian;
the annealer output samples is a first set of annealer output samples;
the comparison value is a first comparison value;
the operations further comprising:
performing a second quantum annealing after configuring the quantum annealer based on the updated coupling parameter to obtain a second set of annealer output samples, wherein each sample of the annealer output samples is associated with a first index value;
providing, to the oracle, the second set of annealer output samples to obtain a third set of oracle outputs; and
updating a field value parameter indexed by the first index value based on the third set of oracle outputs and the learning rate parameter.

13. The media of claim 12, wherein the learning rate parameter is a first learning rate parameter, further comprising:
performing a third quantum annealing after configuring the quantum annealer based on the updated field value parameter to obtain a third set of annealer output samples, wherein each sample of the third set of annealer output samples indicates is associated with the first index value;
providing, to the oracle, the third set of annealer output samples to obtain a fourth set of oracle outputs; and updating an anneal offset indexed by the first index value based on the fourth set of oracle outputs and a second learning rate parameter.

14. A system comprising:
one or more processors; and
memory storing computer program instructions that, when executed by the one or more processors, cause the one or more processors to effectuate operations comprising:
   configuring a quantum annealer based on a parameter of a Hamiltonian;
   performing annealing using the configured quantum annealer to obtain output samples, wherein each sample of the output samples indicates state values of elements of the quantum annealer;
   providing, to an oracle, the output samples to obtain a set of oracle outputs;
   determining an expectation based on the set of oracle outputs; and
   updating the parameter based on the expectation and a learning rate parameter.

15. The system of claim 14, wherein updating the parameter comprises updating the parameter based on a relaxation factor, wherein the relaxation factor is between zero and one.

16. The system of claim 14, the operations further comprising:
   obtaining a maximum change threshold; and
   determining whether a change in energy between a first epoch and a second epoch satisfies the maximum change threshold, wherein:
      the energy indicates a Hamiltonian energy of a set of qubits of the quantum annealer; and
      updating the parameter comprises updating the parameter in response to a determination that the maximum change threshold is not satisfied.

17. The system of claim 14, the operations further comprising:
   obtaining a configuration weight;
   determining a first value based on the configuration weight;
   determining a second value based on the configuration weight, wherein the second value is greater than the first value; and
   determining a ratio between the first value and the second value, wherein updating the parameter comprises updating the parameter based on the ratio.

18. The system of claim 14, wherein configuring the quantum annealer comprises:
   mapping a first subset of qubits of the quantum annealer to variables of the Hamiltonian;
   mapping a second subset of qubits of the quantum annealer to a set of hidden units representing higher-order interactions between the variables, wherein the second subset of qubits are all initialized to the same state value; and
   setting an upper limit to anneal offsets of the second subset of qubits.

19. The system of claim 14, the operations further comprising:
   determining an expectation for a state of a qubit based on a state values of the output samples of the quantum annealer associated with the qubit, wherein a variable is mapped to the qubit; and
   determining a value of the variable based on the expectation.

20. The system of claim 14, the operations further comprising:
   obtaining an anneal offset for a qubit of the quantum annealer;
   selecting an anneal offset difference based on a probability distribution;
   wherein configuring the quantum annealer comprises configuring the quantum annealer to update a field applied on the qubit based on the anneal offset;
   evolving the state of the quantum annealer to obtain a first set of output samples;
   re-configuring the quantum annealer based on a sum of the anneal offset and the anneal offset difference;
   evolving the re-configured quantum annealer to obtain a second set of output samples;
   determining a first energy value based on the first set of output samples and the parameter of the Hamiltonian;
   determining a second energy value based on the second set of output samples and the parameter of the Hamiltonian; and
   updating the anneal offset for the qubit based on a difference between the first energy value and the second energy value.

* * * * *